United States Patent [19]

Intrater et al.

[11] 4,376,806

[45] Mar. 15, 1983

[54] HIGHLY ADHESIVE COATINGS FOR BERYLLIA

[75] Inventors: Josef Intrater, Englewood Cliffs, N.J.; Gene Bertoldo, New York, N.Y.

[73] Assignee: Advanced Technology, Inc., Palisades Park, N.J.

[21] Appl. No.: 315,452

[22] Filed: Oct. 27, 1981

Related U.S. Application Data

[63] Continuation-in-part of Ser. No. 200,514, Oct. 24, 1980, Pat. No. 4,358,506, and a continuation-in-part of Ser. No. 242,716, Mar. 11, 1981, and a continuation-in-part of Ser. No. 268,015, May 28, 1981, Pat. No. 4,374,903.

[51] Int. Cl.³ .............................................. B32B 15/04

[52] U.S. Cl. ................................... 428/469; 428/471; 428/472; 428/632

[58] Field of Search ................ 428/632, 469, 471, 472

[56] References Cited

U.S. PATENT DOCUMENTS 3,086,284 4/1963 Schetky .............................. 428/471
3,556,843 1/1971 Buck .................................... 428/471

*Primary Examiner*—W. Stallard
*Attorney, Agent, or Firm*—Fred A. Keire

[57] ABSTRACT

Highly adhesive composites with an active tin alloy are obtained as coating on beryllia by depositing tin with, e.g. vanadium on beryllia, and heating in a carbon monoxide atmosphere of up to 1000° C.

10 Claims, No Drawings

HIGHLY ADHESIVE COATINGS FOR BERYLLIA

This invention is a continuation-in-part application of our previously filed applications Ser. Nos. 200,514 filed Oct. 24, 1980 now U.S. Pat. No. 4,358,506, 242,716 filed Mar. 11, 1981, and 268,015 filed May 28, 1981, now U.S. Pat. No. 4,374,903.

This invention pertains to composites of beryllia, that is coatings for beryllia (i.e. beryllium oxide), with a coating having excellent adhesion to the oxide with properties heretofore unknown or unachieved when coating beryllium oxide. Sandwich composites of beryllia with said coating between beryllia layers or other composites on top of a coating on a beryllia layer are also within the scope of this invention.

In our previous applications Ser. No. 200,514 and Ser. No. 242,716, as well as Ser. No. 268,015 (the disclosures of which are incorporated by reference herein), there has been disclosed a method for obtaining coatings on various hard-to-coat substrates with excellent adhesion properties. Heretofore beryllium oxide was thought to be an oxide that could not be easily coated, and, in fact, great difficulties have been experienced when attempts have been made to coat beryllium oxide. As far as it is known to the applicants, no particular method has been successful. Although sputtering has been used, it is a three-step operation needing precious metals. When the sputtering process is used, holes cannot be filled. Typically, the test for evaluating acceptability has been penetration ability of the coating, its angle of contact, as well as dewetting upon heat cycling. Still further, for beryllium the capability of a coating for wetting a hole in a beryllium substrate has also been used as a test.

In most instances, these tests have shown that coatings with zero contact angles, wettability, and penetration through holes have been impossible to achieve by any reasonable means.

We have now found that when pressed tin metal powder, which contains vanadium metal powder in an amount from $\frac{1}{8}\%$ to 10%, but typically from $\frac{1}{2}$ to 6% and preferably from $\frac{1}{2}$ to 4% by weight of vanadium, performs outstandingly well when the powders is first compacted, such as by hot rolling tin with the admixture of vanadium and forming preforms or pressed shapes. These preforms or pressed shapes, when placed on beryllium oxide substrate and heated to about 1000° C. in an atmosphere of carbon monoxide, will cause outstanding wetting of the beryllium oxide.

These preforms, when thus heated, will cause the coating to flow and capillarily penetrate even the tiniest holes and wet the walls thereof, even flowing through to the underside of the substrate through these holes.

When the same attempt was made to coat beryllium oxide in a hydrogen atmosphere, the end result was unsuccessful in terms of zero contact angle, wettability, and hole penetration. Moreover, further experiments have now shown that various combinations of metals with tin powder give various end results. It thus appears that almost perfect results are obtained with tin vanadium powder compacts in a ratio of tin to vanadium being from 99$\frac{1}{2}$% tin to $\frac{1}{2}$% vanadium to 96% tin to 4% vanadium. Other results have been obtained with other combinations and these will be set out further below.

Based on the above achievement, beryllium oxide can now be employed for applications heretofore not possible because of its repellancy of coating compositions, especially metal coating compositions. Thus, for example, beryllium oxide is an excellent thermal conductor and a heat sink to which various electrical components could well be attached to provide an excellent means for dissipating heat. Heat conductivity of beryllium oxide is about 57% of that of copper and 106% of that of aluminum.

Turning now to the specific perparation of the preforms composed of the powders of tin and vanadium, as it can well be understood, tin and tin alloys are within the scope of the present invention. By tin alloys are meant those alloys in which the tin is more than 30% but typically 50%, by weight. Lead is a metal for alloying with tin and so is bismuth.

As the other component of the combination, metals such as chromium, molybdenum, vanadium, and mixtures thereof are intended as a group of preferred metals. Of the various tin alloys, tin and lead alloys, such as having tin from 62% and the balance lead, are prevalent and constitute another embodiment of this invention. On the basis of a hundred parts per tin alloy, the addition of vanadium and the other active materials are in an amount such that the above percentage compositions are observed, i.e. up to 10%.

The metallurgically active metals or alloys thereof are occurring, it is believed, in the carbon monoxide atmosphere, and these form the strongly adhesive bond. These metals are first performed by compacting. This can be done, for example, by rolling or die-compacting, but preferably by rolling a thin sheet of the "active" metal powder composition. Powders are generally used in a fairly wide distribution range and powder sizes are not restrictive. These sizes can vary from colloidal to particulates of up to two or three millimeters.

Of course, an admixture of the metals when merely placed on top of the beryllium oxide element can also be used to form the coating, but it has been found much more convenient to have the active metal in a form such as a preform of the shapes that are desired, such as shims, foils, and stamped out forms, e.g. to match the electronic component to be mounted on the beryllia base.

It has also been found that, due to the excellent adhesive characteristics, beryllium oxide can now be bonded to other metals and other substrates, thus further improving the mechanical or chemical properties of the composition, such as for heat dissipation purposes or for supporting beryllium oxide on a metal substrate to overcome the brittleness properties of beryllium oxide, e.g. for ablative purposes.

Again, as mentioned in the above-identified companion applications which are incorporated by reference herein, the various sandwich and composite formations are within the contemplation of the invention herein. The various sandwiches are those as previously disclosed, i.e. those compositions which readily alloy with tin and thus form the desired components. The initial coating formation and the alloying, in order to achieve the composites with the coatings on beryllium oxide, must take place in a carbon monoxide atmosphere which is critical to the obtention of the end product. If the same heating were to take place in a hydrogen atmosphere or other inert gas atmosphere, in absence of carbon monoxide the formed bond appears to be inadequate. Hence, an element of the invention is the critical presence of carbon monoxide which must be maintained during the bonding reaction so as to form the heretofore unobtainable and highly desirable coating compositions. Generally, a 100% carbon monoxide atmosphere is best maintained, although lesser amounts of carbon monoxide will work.

If a new and different bond is sought to be formed with a different layer of the same substrate, then the compositions must be joined together with another active shim or shape placed on the coated, other substrate, and then the same joined together. The two substrates are then pressed together, all as part of the repeated operation.

As previously noted in our other applications, copper-tin is one of the most readily used means to form a bronze interlayer because copper soaks up tin. This reaction raises the melting point of the preform allowing, during the course of joining, or subsequently, by placing a copper foil on the coating, the necessary shapes to form.

Beryllium oxide is readily available in the trade in various forms and shapes thereof, such as from Brush-Wellman Corporation, Cleveland, Ohio, and National Beryllia, Haskell, N.J.

The following examples are included herein to illustrate the various aspects of the invention as well as the preferred embodiment. These examples are merely illustrations and are not intended to limit the broader scope of the invention. The invention, as presently contemplated and as envisioned, is useful with various combinations of the carbide or carbonyl formers previously disclosed, such as in Application Ser. No. 06/242,716 filed Mar. 11, 1981.

TABLE I

| Example | Tin Alloy Combination | Appearance of Coating |
|---|---|---|
| 1 | Sn Cr Mo (4gr)* | Fair wetting and good bonding |
| 2 | Sn Cr V (1gr)* | Wetting is like water flowing with a solid bond |
| 3 | Sn Cr V (2gr)* | Even better than #2 |
| 4 | Sn Cr V (4gr)* | Almost perfect complete spreading |
| 5 | Sn V (½gr) | Perfect spread and perfect bonding |
| 6 | Sn V (1gr) | Same as #5 |
| 7 | Sn V (2gr) | Same as #5 |
| 8 | Sn V (4gr) | Same as #5 |
| 9 | Sn (88gr) Bi (12gr) Cr (8gr) V (4gr) | Similar to #2 with smoother finish |
| 10 | Sn (62gr) Pb (38gr) Cr (8gr) V (8gr) | Similar to #9 |
| 11 | Sn (98gr) Pb (2gr) Cr (8gr) V (4gr) | Better than #10 in terms of additional flow |

*92gr tin, 8gr chromium, to which is added the indicated metal, by weight, in grams.

Each of the examples was carried out by depositing a preform compact of the powder components recited above in Table I of the defined proportions on a beryllia substrate, and then introducing the same into a furnace which is held at a temperature from 800° C. to 1000° C. and which contains substantially only a carbon monoxide atmosphere. After the reaction the carbon monoxide atmosphere may be vented and oxidized and cooling may take place in inert atmosphere.

Based on the above Table, it is evident that, as presently contemplated, the preferred embodiment consists of the combination of tin with vanadium. In the indicated order of achievement, a perfect spread and perfect bonding means the deposit shows a zero to negative angle of bonding, and cannot be dewetted. Moreover, an aperture in the beryllia substrate is penetrated readily by the active alloy with the alloy strongly adhering to the walls of the aperture, and even spreading on the underside of the substrate. The aperture is about 1/16 inch in diameter.

What is claimed is:

1. A composite of beryllium oxide and tin or tin alloys, wherein tin or tin alloy comprise as an additive a carbide or carbonyl former, said composite having the tin and tin alloy as a highly adherent coating, film, or layer on a beryllium oxide base or substrate, said coating characterized by being non-dewettable upon heat cycling, having a zero or negative angle of contact and having penetrability in interstices or through an aperture in said substrate.

2. The composite as defined in claim 1, wherein the carbide or carbonyl former is chromium, titanium, cobalt, iron, nickel, manganese, vanadium, tantalum, tungsten, or molybdenum or mixtures of same.

3. The composite as defined in claim 2, wherein the carbonyl or carbide former is vanadium.

4. The composite as defined in claim 2, wherein the carbide or carbonyl former is chromium.

5. The composite as defined in claim 2, wherein the carbide or carbonyl former is a mixture of chromium and vanadium.

6. The composite as defined in claim 2, wherein tin is an alloy of tin and lead.

7. The composite as defined in claim 2, wherein the tin alloy is a mixture of tin of 62% and lead of 38%.

8. The composite as defined in claim 1, wherein the additive to tin or tin alloy is vanadium in an amount from about ½ gr to about 10 gr per 100 grams of tin or tin alloy.

9. The composite as defined in claim 8, wherein the amount of vanadium is from ½ gr to 4 gr, by weight, per 100 gr of tin or tin alloy.

10. The composite as defined in claim 1 wherein the tin alloy is an alloy of tin and bismuth.

* * * * *